(No Model.) 2 Sheets—Sheet 1.

R. S. PEASE.
METHOD OF PREPARING GLASS METAL.

No. 487,425. Patented Dec. 6, 1892.

Witnesses:
James F. Duhamel
Horace A. Dodge.

ROGER S. PEASE,
Inventor,
by Dodge Sons,
Attys.

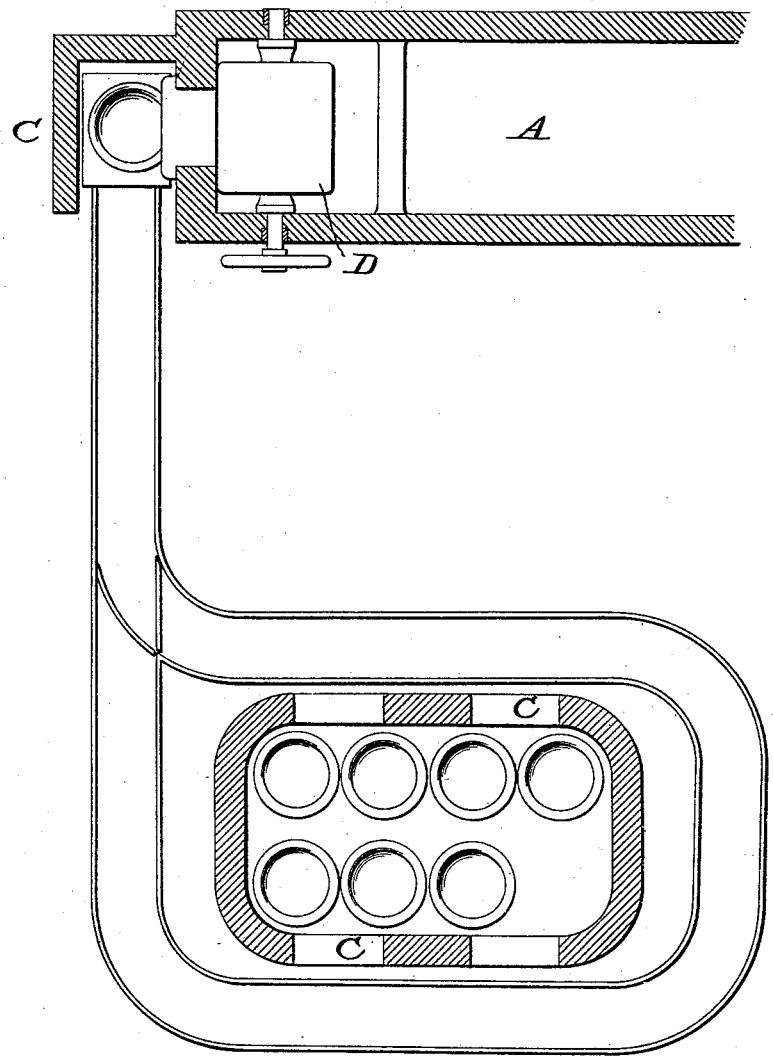

United States Patent Office.

ROGER S. PEASE, OF ROSE, MINNESOTA.

METHOD OF PREPARING GLASS METAL.

SPECIFICATION forming part of Letters Patent No. 487,425, dated December 6, 1892.

Application filed July 25, 1892. Serial No. 441,190. (No specimens.)

*To all whom it may concern:*

Be it known that I, ROGER S. PEASE, a citizen of the United States residing at Rose, in the county of Ramsey, and State of Minnesota, but having my place of business at Minneapolis, Minnesota, have invented certain new and useful Improvements in Method of Preparing Glass Metal, of which the following is a specification:

My invention consists in a novel method of preparing glass metal for the manufacture of glass, whereby time is saved and the life of the melting pots is prolonged. The method may be carried out with different forms of apparatus, and the present application is not restricted to nor is it designed to cover any special construction of apparatus, but merely the process or method, comprising a series of operations or steps, performed in a stated order, and effecting a given result. In order to facilitate the explanation of said method or process, I have illustrated in the annexed drawings apparatus suitable to the purpose.

Figure 1:
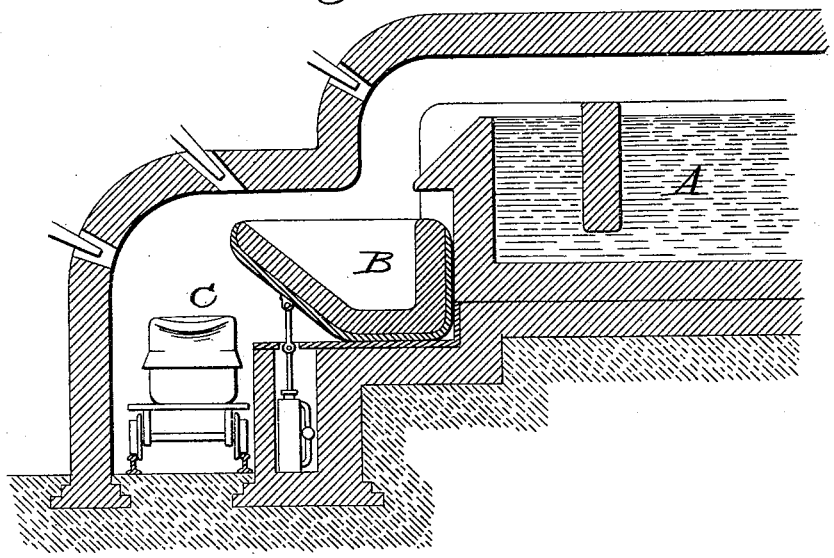
Figure 2:
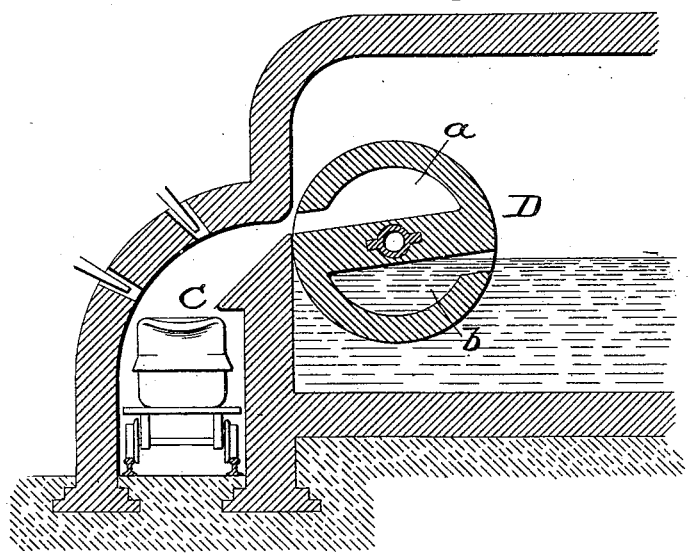

Figure 1 is a vertical sectional view of a portion of a melting tank and transferring vessel; Fig. 2, a similar view, but showing a different form of transferring device; and Fig. 3, a horizontal sectional plan view of the several parts of the plant necessary to, or involved in carrying the invention into practice.

In the manufacture of plate glass it is, and for many years has been, customary to prepare the metal in pots, from the first melting of the batch to the last fining thereof, and experience has demonstrated that the highest degree of perfection is attained by this plan.

In recent years there has been a strong and growing tendency to substitute large melting tanks for the pots, the labor required to charge and to draw off the metal from such tanks being less, and the tanks being materially cheaper to provide and to heat than the pots.

In using pots, the usual procedure is as follows: The batch being suitably prepared and the pot furnace being fired and brought to a proper temperature, the pots are each supplied with the batch in such quantities as they will contain when well heaped. The batch materials are sometimes given a slight preliminary heating before being supplied to the pots, but are more commonly placed therein in a cold state and they consequently tend to cool the pots. The heat being properly regulated and maintained, the batch gradually melts and in melting settles down until it about one-third fills the pot. A second supply is then added, and not unfrequently a third, but even with the latter there is commonly a space of about three inches at the top of the pot that is empty. After the batch is melted it is kept in the furnace until the metal fines, that is to say, until the denser and finer material settles to the bottom and the bubbles of gas and air rise to the surface and escape, the fire being checked and the heat reduced for the fining operation. When the metal is properly fined, the pots are taken from the furnace and their contents poured upon the casting table, after which the pots are returned to the furnace. The opening of the furnace for the removal and replacement of the pots permits the furnace to become comparatively cool by exposure to the atmosphere, and they when replaced within the furnace, tend to further lower its temperature. When the pots are all replaced within the furnace, the heat is increased and the furnace and pots brought to a very high temperature preparatory to being charged with fresh batch which being cooler or cold, lowers the temperature of the furnace and pots and is apt to cause breakage of the pots. The operations of melting, adding batch, fining &c. then follow in the order above stated. Notwithstanding the greater labor and expense involved, however, pots are generally employed for plate-glass making at the present time.

Under my plan the melting of the glass is effected in a tank, from which it is transferred to pots by suitable transferring devices which prevent the loss of heat, and the pots are then placed in a furnace where the metal is duly fined. When the metal is ready for use the pots are taken one by one from the furnace and poured in the usual way, but instead of being at once returned to the furnace and recharged with an unmelted batch, they are charged with molten metal from the tank and then returned to the furnace for fining, and this order or succession of steps is repeated continuously. The space in which the pot is placed while being charged with molten metal is kept hot, and as the pots are promptly brought to the charging place after being poured, they are not permitted to become cold, hence they receive the molten metal without serious danger of injury. The pots being heated by the molten metal with which they are charged, are returned to the furnace at a temperature equal to or about equal to that of the furnace, the contents of the pots serving also to bring the furnace back to its normal temperature, or nearly so. It will thus be seen that I avoid the repeated opening of the furnace for charging the pots; the checking of the fire, as only fining is done in the pot furnace; and the introduction of cold pot and cold batch. I also enable the pots to be supplied and poured from two to four times per day as against once in twenty-four to thirty-two hours under the existing plan, and I greatly lessen the danger of breakage and decrease the number of pots necessary to be used.

Referring now to the drawings,—A indicates a melting tank of any approved construction as to size, materials, and means of heating. This tank is supplied with batch at one end, and the molten metal may be delivered by displacement into a tipping transfer vessel B, Fig. 1, whence it is poured into the pot C, or it may be discharged by the rocking or rotating shell D, shown in Fig. 2,—all being duly covered or inclosed to prevent escape of heat. The vessel B is in the nature of a large pot, so placed as to receive the molten metal flowing from the tank A by displacement, and is cut away at its front so that it may be readily tipped or rocked to discharge its contents into the pot C. Any suitable means may be employed for tipping the vessel B, a fluid-pressure cylinder and piston being indicated in the drawings.

The apparatus shown in Fig. 2 is preferred to that shown in Fig. 1 for the reason that the molten metal from the bottom of the tank enters the space $a\,b$ of the shell D, and is discharged therefrom when the containing space is carried above the axis of the drum, or to the position of the space $a$ in Fig. 2; but said apparatus constitutes the subject-matter of a separate application and is not herein claimed.

The operation stated briefly is as follows: The batch is melted in the tank,—the molten metal is delivered from the tank to the pots; the pots are placed in the oven and the metal is fined; the pots are then taken from the oven, their contents are poured upon the casting table, and they are taken to the tank, recharged with molten metal, replaced within the oven, the metal is allowed to fine, and the pots are again poured, and so on indefinitely, the whole constituting a continuous process.

Having thus described my invention, what I claim is:—

The process or method of preparing and delivering glass metal, which consists in the following steps, performed in the order stated: first, melting the batch in a tank; second, delivering said molten metal to a series of pots; third, placing the pots in an oven and maintaining a proper temperature therein until the metal is fined; fourth, removing the pots from the oven and pouring their contents; fifth, delivering molten metal from the tanks to the emptied pots, and, sixth, replacing the pots within the oven for fining the metal.

In witness whereof I hereunto set my hand in the presence of two witnesses.

ROGER S. PEASE.

Witnesses:
HORACE A. DODGE,
WILLIAM W. DODGE.